(12) United States Patent
Meier et al.

(10) Patent No.: US 9,251,413 B2
(45) Date of Patent: Feb. 2, 2016

(54) METHODS FOR AUTOMATIC STRUCTURED EXTRACTION OF DATA IN OCR DOCUMENTS HAVING TABULAR DATA

(71) Applicant: Lexmark International Technology S.A., Geneva (CH)

(72) Inventors: Ralph Meier, Rastede (DE); Harry Urbschat, Oldenburg (DE); Thorsten Wanschura, Oldenburg (DE); Johannes Hausmann, Marseilles (FR)

(73) Assignee: Lexmark International Technology, SA, Meyrin (CH)

( * ) Notice: Subject to any disclaimer, the term of this patent is extended or adjusted under 35 U.S.C. 154(b) by 43 days.

(21) Appl. No.: 14/304,181

(22) Filed: Jun. 13, 2014

(65) Prior Publication Data

US 2014/0369602 A1 Dec. 18, 2014

Related U.S. Application Data (60) Provisional application No. 61/835,530, filed on Jun. 14, 2013.

(51) Int. Cl.
*G06K 9/62* (2006.01)
*G06K 9/00* (2006.01)

(52) U.S. Cl.
CPC .................. *G06K 9/00463* (2013.01)

(58) Field of Classification Search
None
See application file for complete search history.

(56) References Cited

U.S. PATENT DOCUMENTS

| | | | | |
|---|---|---|---|---|
| 6,336,094 | B1* | 1/2002 | Ferguson | G06K 9/2054 705/35 |
| 9,042,653 | B2* | 5/2015 | Lin | G06F 17/246 382/181 |
| 9,069,768 | B1* | 6/2015 | Sampson; Steven | G06F 17/3011 |
| 2005/0139649 | A1* | 6/2005 | Metcalf | G06Q 20/20 235/375 |
| 2007/0053611 | A1* | 3/2007 | Wnek | G06K 9/00469 382/294 |
| 2013/0021344 | A1* | 1/2013 | Wang | G06K 9/00442 345/426 |
| 2013/0191715 | A1* | 7/2013 | Raskovic | G06F 17/245 715/227 |

FOREIGN PATENT DOCUMENTS

JP 2005100079 A * 4/2005 ............... G06K 9/20

* cited by examiner

*Primary Examiner* — Brian P Werner (57) ABSTRACT

Methods to select and extract tabular data among the optical character recognition returned strings to automatically process documents, including documents containing academic transcripts.

20 Claims, 7 Drawing Sheets

METHODS FOR AUTOMATIC STRUCTURED EXTRACTION OF DATA IN OCR DOCUMENTS HAVING TABULAR DATA

CROSS REFERENCES TO RELATED APPLICATIONS

The present application is related to and claims priority under 35 U.S.C. 119(e) from U.S. provisional application No. 61/835,530, filed Jun. 14, 2013, entitled, "Methods For Automatic Structured Extraction Of Data In OCR Documents That Have Tabular Data," the content of which is hereby incorporated by reference herein in its entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to tools to manage electronic content and, more particularly, to methods to automatically select and extract relevant data among the optical character recognition returned strings in scanned printed documents having columnar data, including documents such as academic transcripts.

2. Description of the Related Art

To select and extract relevant data from a scanned document having data arranged in a table or in columns, such as an academic transcript, optical character recognition (OCR) must contain the proper information strings and their positions to accurately extract the information. A "string" is an ordered collection of characters, digits and punctuations. To this end, the printed documents are scanned, and optical character recognition is applied to return strings and the respective positions for all printed text.

OCR systems can be trained to recognize characters in any user-defined font—not just fonts that are created specifically for optical character recognition (OCR-A, OCR-B, MICR, SEMI). OCR systems can be taught to recognize a full character set in any font created for any language. Problems can arise when data in the document is presented in a table or columnar form having header information for each column. Line and other graphic elements may interfere with recognition of the text. For multi-line or split-line header information, a header composed of two or more lines may be recognized as two separate elements rather than a single element. OCR may be incomplete or inaccurate due to dirt, different shades of printing, stamps and the like, which can result in the misapplication of the return strings, either without meaning and/or in unrecognized string positions. It would be beneficial to have a method for the automatic extraction of data from an OCR document that analyzes the strings in the OCR document for tabular or columnar information and selects the to header information and the information corresponding to each header and assigns them to a table cell (i.e., both a labeled column and row) placed in a table returned to the user for review or made available to a calling application for further use. It would be a further advantage to allow the user to arrange the information in the returned table to meet the user's needs.

SUMMARY

Methods for automatic structured extraction of data in optical character recognition (OCR) documents having tabular data are disclosed. One example method of extracting tabular data from an OCR document includes receiving the OCR scan document file for processing; identifying, for each OCR scan line, any string and its position within the OCR scan line and forming a content cell line by associating a content cell with each identified string; localizing table column content cells by locating repetitive string patterns within each OCR scan line; forming a cluster group of OCR scan lines when the repetitive string patterns exceed a predetermined confidence level; determining for any ungrouped line that such ungrouped line is a header line when a comparison of one or more strings of such ungrouped line with a predefined set of corresponding header strings associated with respective column identifiers used in an output table for extracted data exceeds a predetermined confidence threshold; associating a header cell for each of the one or more strings in each determined header line; for each header line and its associated header cell, associating the group of cluster OCR scan lines and the corresponding content cell line and the corresponding strings of each content cell line with a corresponding header string in the header line when a format of the string of the corresponding content cell line is consistent with a format of the corresponding header string; for each header line, determining if a repetitive pattern of strings is present and if a repetitive pattern is determined, localizing the location of a breakpoint between each repetitive pattern and processing the header line and the corresponding content cell line as a multi-stack table; determining, for each header line, whether one or more header strings are missing patterns and repairing the header line missing patterns by providing a dummy data string for each missing pattern in the header strings; determining, for each content cell line, whether one or more content cell line strings are missing patterns and repairing the content cell line missing patterns by providing a dummy data string for each missing pattern in the content cell line strings; and for each header string having a corresponding column identifier in the output table, mapping the corresponding to content cells into a corresponding number of cells in the output table aligned with the column identifier.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Terms such as "first", "second", and the like are also used to describe various elements, regions, sections, etc. and are also not intended to be limiting. Like terms refer to like elements throughout the description. As used herein, the terms "having", "containing", "including", "comprising", and the like are open ended terms that indicate the presence of stated elements or features but do not preclude additional elements or features. The articles "a", "an" and "the" are intended to include the plural as well as the singular unless the context clearly indicates otherwise.

In addition, it should be understood that example embodiments of the present disclosure may include both hardware and electronic components or modules that, for purposes of discussion, may be illustrated and described as if the majority of the components were implemented solely in software. As such, it should be noted that a plurality of hardware and software-based devices may be utilized to implement the invention.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus such that the instructions which execute on the computer or other programmable data processing apparatus may create means for implementing the functionality of each block or combinations of blocks in the diagrams discussed in detail in the descriptions below.

These computer program instructions may also be stored in a non-transitory, tangible, computer readable storage medium that may direct a computer or other programmable data processing apparatus to function in a particular manner, such that the instructions stored in the computer readable storage medium may produce an article of manufacture including an instruction means that implements the function or functions specified in the block or blocks. Computer readable storage medium includes, for example, to disks, CD-ROMS, Flash ROMS, nonvolatile ROM and RAM.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Output of the computer program instructions, such as the process models and the combined process models, as will be described in greater detail below, may be displayed in a user interface or computer display of the computer or other programmable apparatus that implements the functions or the computer program instructions.

The present method localizes, extracts, validates and scores the content of documents having tabular information to be processed, such as invoices, academic transcript documents, including high school, college or university, and military transcripts, as they are commonly in used within the United States. The objective is to automatically return the digitized text in a structured form from printed documents that have been OCRed. To this end, the printed documents are scanned and optical character recognition is applied to return strings and their respective positions for all printed text to the extraction system 100.

It will be understood by those skilled in the art that OCRed text is only one example input to the extraction system 100. In some example embodiments, the extraction system is capable of working with, accepting or processing documents provided electronically which do not need character recognition. One example of such documents would be the input of documents in the Portable Document Format (PDFs). PDF document pages behave like an image but already contain the strings and respective positions of the content. Thus, there is no need to apply OCR since the information needed by the extraction system is already present. For simplicity, while OCRed text is discussed in the example embodiments, it shall not be construed as limiting in any way.

The term "document" as used in the following may mean a whole file or text document or a fraction of a whole document such as a page, a paragraph, or any smaller unit of the whole document. Tabular data is data that is arranged in spaced columns on one or more pages of a document or is information arranged in rows and columns or in the form of a matrix of cells, such as is found in a spreadsheet. Tabular data refers to the arrangement of the information and not to the specific type of data found at a given location in the column, row or cell. Tabular data may be image data or character data, such as a word or a string composed of a combination of letters, numbers and/or symbols, e.g., MATH/102. In extraction system 100, any data format not found within the character set data is considered to be image data unless extraction system 100 has been specifically trained to consider such data as character data. Graphic line elements may be provided as a border around each cell, between columns and/or between rows to form full or partials grids around the tabular data. Character data includes alphabetic characters, such as A-Z, a-z; digit characters 0-9; and commonly used symbol characters such as those found on keyboards, such as #, $, %, &, *, +, =, !, ', ?, @. Where a language other than English is used, the character data set would be modified to include the appropriate alphabetic, digit and symbol characters found in such other language. For example, a French character set would include characters such as "à" and "ç".

Figure 1:
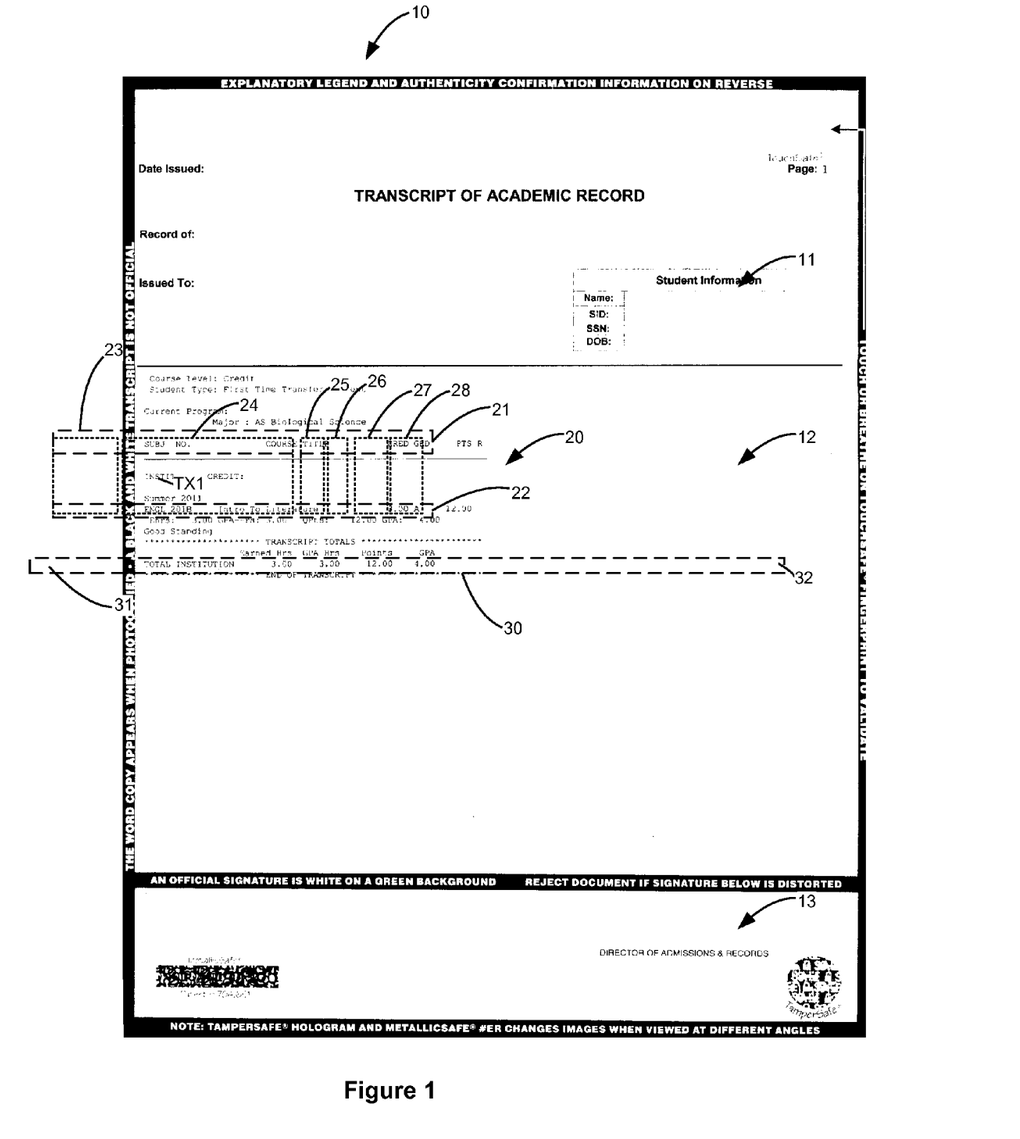
FIG. 1 is one example document having tabular information to be extracted.

Shown in FIG. 1 is a one example of a document having tabular or columnar data. As illustrated, document 10 is a college transcript having three sections 11-13. Section 11 contains student identification information. Section 12 provides course listings, grades, grade point, credits, GPA and/or other information related to the courses taken. Section 13 provides university or institution identifying information and authentication information. Transcript 10 may be provided as part of an admissions package for a graduate school or to any employer that is to be electronically processed. Many institutions will remove identifying information and wish to electronically provide only relevant information to a reviewer.

For purposes of illustration only to understand the present system, only information related to courses taken, course credits, grades, and grade points is desired to be included in the electronic file credits. Further, because, for example, the reviewer finds knowing the course title is more informative, it is desired to present that information first. The desired information is contained within section 12 of document 10. As shown in FIG. 1, this information is arranged as tabular information in the form of a table 20 having two rows 21, 22, each indicated by a large dashed line box and six columns 23-28, each indicated by a small dashed line box. The boxes have been added to more easily show the location of the desired information. Row 21 contains header information while row 22 to contains course information. Columns 23-27 header information are "SUBJ NO.", a course identifier; "COURSE TITLE", the name of the course; "CRED", the number of credits the course is worth; "GRD", the letter grade earned, typically A-D and F; and "PTS", the credit points earned, respectively. Column 28 header is simply the letter "R" and, for this particular university, made be used to indicate whether or not a given course was retaken. Also provided in section 12 is currently unwanted information, such as "Course Level: Credit", "Student type: First Time Transfer Student, "Current Program," Transcript Totals", etc. Even appearing within table 20 there is an extraneous phrase "Institution Credit". This extraneous phrase is unnecessary to evaluate the transcript. Also indicated in FIG. 1 is a line 30 containing border elements 31, 32 on each end along with text and numbers.

Figure 2:
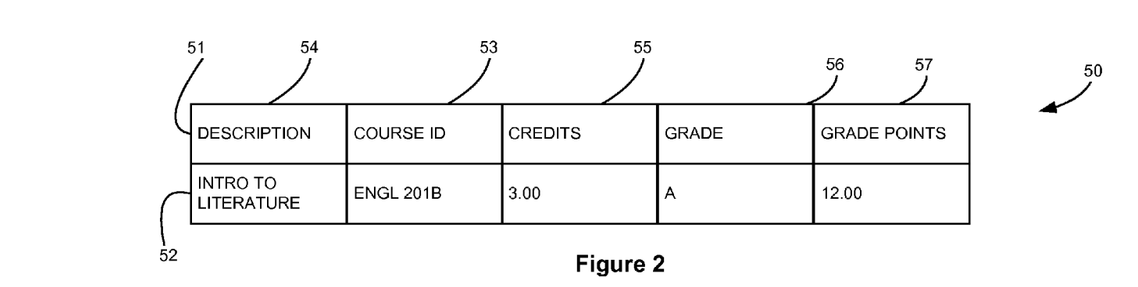
FIG. 2 is one example of a table created using information extracted from FIG. 1.
Figure 3:
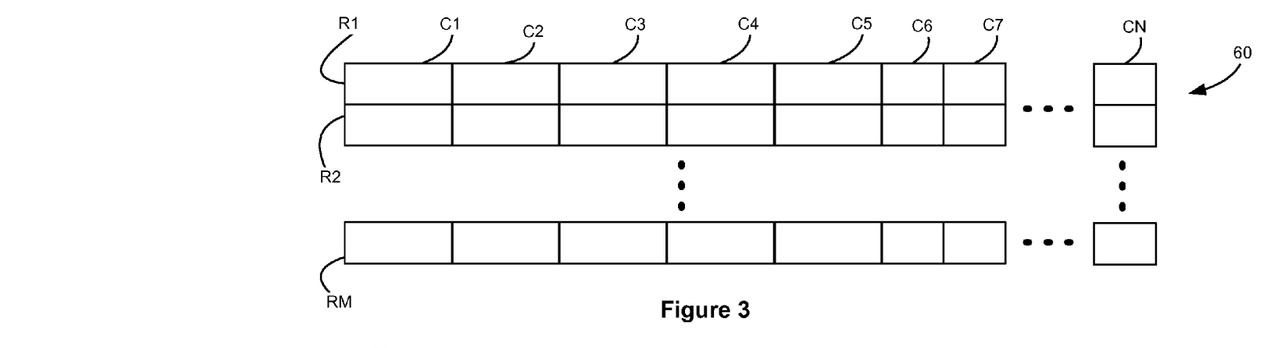
FIG. 3 is a generalized M by N table that may be created using an example extraction system.

Shown in FIG. 2 is an example output of the example extraction system 100 based on input derived from an OCRed version of document 10. As shown, table 50 comprises rows 51, 52 and columns 53-58. Rows 51, 52 correspond to rows 21, 22 of table 20. Columns 53-57 correspond to columns 23-27; however, Column 54 corresponding to column 24, "Course Title", now appears as the first column from the left rather than being the second column from the left. Further, the header information in each of columns 53-57 has been changed to read "Course ID", "Description", "Credits", "Grade", and "Grade Points, respectively, from "SUBJ NO.", "COURSE TITLE", "CRED", "GRD" and "PTS". Also the information in column 28 has not been carried over to table 50. The information from table 20 has been extracted by the system of the present invention as explained below and mapped to a table having a structure and header information arrangement that the user desires. FIG. 3 presents a generalized output table 60 having M rows by N columns. The cells in table 60 are shown as a block, but table 60 may be formed of data arranged in a tabular form.

Figure 4:
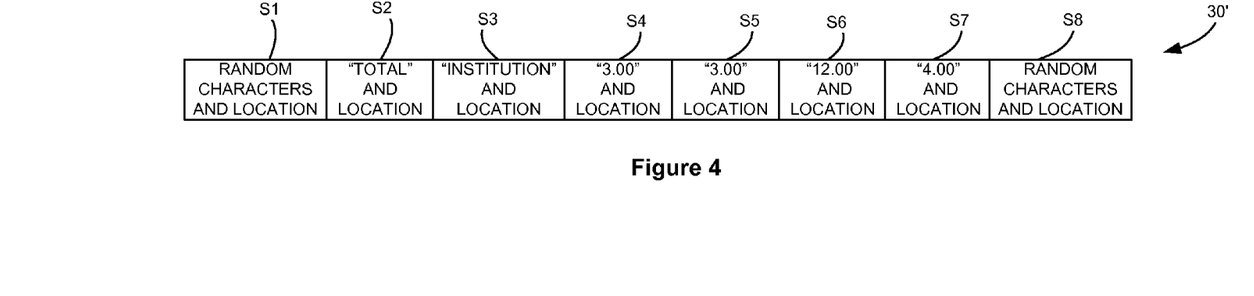
FIG. 4 is a schematic illustration of the structure of an OCR scan line.

As mentioned, document 10 is OCRed, and the resulting file is processed by the extraction system of the present invention to extract the desired information. In general, an OCR file contains lines which are comprised of strings and the location of the string on the original document. White space information is typically not provided in the lines that are returned. An OCR line may be viewed as a horizontal rectangular space of a predetermined height in a position that extends between the left and right margins of the document page. Generally, line height corresponds to character height in the document but may be greater or less than that. A "string" may be viewed as an ordered collection of characters, digits and punctuations. FIG. 4 is an illustration of the OCR line 30' that corresponds to line 30 to shown in FIG. 1. Determining the content of each string S1-S8 in line 30' is a function of the OCR operation, and each string provides character information along with location information. As is known, the location information is the location of the top left corner and bottom right corner of where the string resides on the document page. Because location information is not a needed element for processing of the string by the present system, it will not be further referenced when describing a string. Strings S1 and S8 contain random characters as the OCR operation cannot recognize the border elements 31, 32 in line 30. String 2 contains the text "Total", and string 3 contains the text "Institution." The OCR operation can recognize the white space between the words "Total" and "Institution" and treats them as separate strings. Strings S4-S7 each respectively contains the numbers "3.00", "3.00", "12.00". and "4.00". Similar strings are generated for each textual element on the page that is being OCRed. Once the document page has been OCRed, the OCR file may then be received for processing. In some alternate embodiments, the OCR file may contain data from multiple pages in a document.

Figure 5:
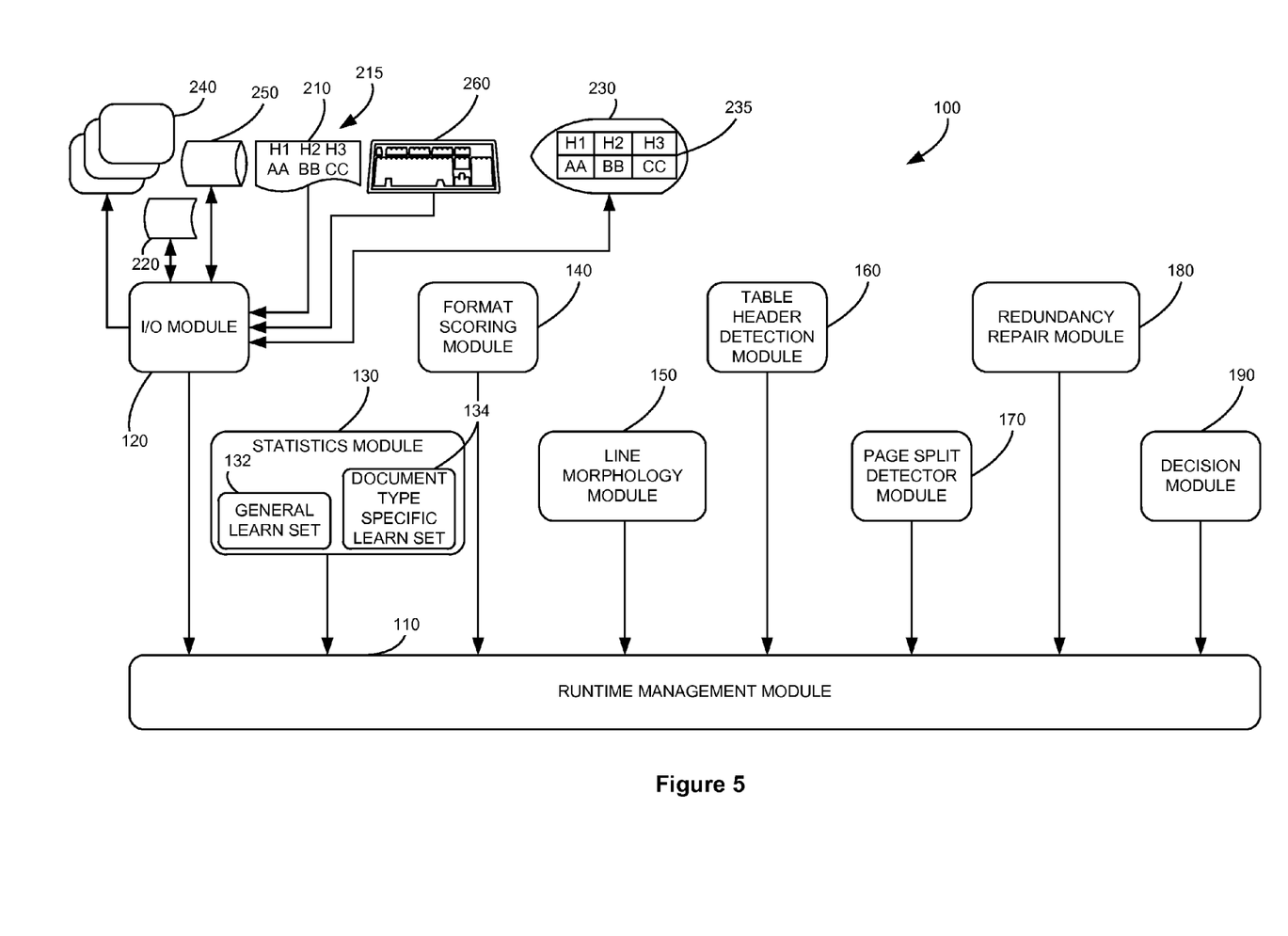
FIG. 5 is a system diagram of one example extraction system.

FIG. 5 is a representation of the software modules comprising the present extraction system 100 for extracting tabular data and presenting it to a user or other module in a structured form. All modules in extraction system 100 are supported by the runtime management module 110. Interacting with runtime management module 110 are I/O (input/output) module 120, statistics module 130, format scoring module 140, table header detection module 150, line morphology module 160, page split detection module 170, redundancy-based repair module 180 and decision module 190. Runtime management module 110 is responsible for allocating, deallocating and supporting modules 120, 130, 140, 150, 160, 170, 180, 190 and instantiation of each module 120-190, and for providing message and data handling. In addition, runtime management module 110 handles all interactions with I/O module 120 and statistics modules 130.

I/O module 120 handles the data flow between all internal modules 110, 130, 140, 150, 160, 170, 180, 190, all external devices and any external modules. Accordingly, I/O module 120 accepts as input a document 210 having image data and/or OCR character and digit data that will be processed by extraction system 100. As illustrated, document 210 contains tabular data 215. I/O module 120 provides interfaces to storage 220, which may be internal, external, temporary or persistent; generates output 235 to a display 230 (e.g., to a screen, touch screen, etc.) or output files to one or more calling application modules 240; or posts data into a database 250. I/O module 120 can collect feedback from the user via an input device, such as a keyboard 260 or display 230. Collecting user feedback may be accomplished in many ways, including, editing by the user of the structured form produced by extraction system 100 or through interaction with the image or OCR data of document 210.

I/O module 120 manages all input/output tasks within the extraction system 100. This encompasses the loading, storage, modification, deletion, re-sizing storage and other data housekeeping tasks needed by the other modules. It is also handles user/document/image input and makes the information available to the other modules for pulling by those modules or pushing the information to such modules. I/O module 120 may also notify users or modules of changes. Additionally, I/O module 120 provides an abstraction layer to external modules, such as application modules 240, that can provide output or request input.

Statistics module 130 manages the input, storage, access and modification of all data needed by the other modules within system 100. Statics module 130 interacts with modules 110, 120, 140, and 150. Statistics module 130 takes care of the allocation and de-allocation of required resources and returns exceptions in cases of error in the statistics. Statistics module 130 also performs statistical functions such as calculating the average, mean, deviation etc. Statistics module 130 provides an abstraction layer to modules 110, 120, 140, 150 for accessing the required statistics or data. The term "statistics", as used here, refers to the aggregated data that has been processed, modified and accumulated from input (e.g., scanned documents, user input, etc.).

Statistics module 130 is responsible for holding, aggregating, providing and handling all statistically relevant data. Statistics module 130 contains a general learn set 132 having a lexicon of generally found strings including, generally found header strings; a base character set of generally found format descriptions of strings; general table column identifications to be used in the output table; and the tags needed from all other modules. The types of documents to be processed may also be defined in the general learn set 132 of statistics module 130.

For example, extraction system 100 may be used with various documents, such as transcripts, invoices and bills of lading. The foregoing list is not meant to be limiting to but only illustrative of the various document types that may be used. In addition, a learn set 134 specific to each document type may be provided in statistics module 130 for each document type. The document type learn set 134 may contain, for a specific type of document, a lexicon of specific strings including, a specific header string generally associated with or used in that document type; specific format descriptions generally used in that document type; a specific character set generally used in that document type; specific table column identifications generally associated or used in that document type for use in the output table; and user provided mapping of headers found in the OCR scan document to be used in the output table containing the extracted data. Again, the foregoing list is not meant to be limiting but only illustrative of the various document types that may be used.

A minimum learn set should have at least a user provided mapping or arrangement of input column identifiers (ids) to the output table and common header strings and respective column identifiers. Alternately, in some example embodiments, a minimum learn set provides user provided mapping or arrangement of input column identifiers to the output table and user provided specific format descriptions. In yet another alternative example embodiment, the minimum learn set provides user provided mapping or arrangement of input column identifiers to output table and pre-defined words and strings. In still other example embodiments, the minimum learn set provides a user provided mapping or arrangement of input column ids to the output table and user or external module defined page split lines. Other combinations of information, including a combination of two or more of the above example minimum learn sets, provided in a learn set are possible. The more information provided, the better the system will work in terms of reliability and precision of what is extracted.

Statistics module 130 may also contain rules or assumptions used by the other modules. One basic rule or assumption used in the present extraction system 100 is that all cells within a table found in an OCR scan document should contain data. A second rule of assumption is that all columns have a header or all the columns do not have a header. This may appear contradictory, but it is rare that in a given table that some columns will have header while other columns in the same table have no headers. For the cases not fitting these two assumptions, redundancy repair module 180 provides virtual headers or virtual cell data to assist or aid the other modules in the pattern finding and content recognition process. Statistics module 130 makes use of I/O module 120 in order to access, write, read, post or to modify data within files or other sources or destinations.

Format scoring module 140 recognizes and weighs the formats of strings with respect to the potential column Format scoring module interacts with modules 110, 130, 150, 160, 180, and 190. Format scoring module 140 is responsible for scoring words and/or strings based on the location of the column containing the words and/or strings. For each combination of a string with a column type, a normalized score is derived from the learn set. Deviations are then returned, and the combination is weighed against an OCR error matrix of character and symbol mismatches. For example, the word "ENG101" would have a high score with respect to the transcript column "Course ID" and a low score for the "Grade," "Grade Points," or "Credit" column headers. A medium score would be expected for the Course ID column if the description also contained the course number or pieces thereof.

Format scoring module 140 is based on an established representation of the characters composing a word and/or string. Format scoring module 140 is trained with examples gathered from documents and collects statistics of the formats it is presented. Format scoring module 140 also calculates deviations to obtain scores for formats that are not within the learn set. This calculation is accomplished with a modified dynamic programming algorithm that ensures the best matching format is found. There are two scoring factors: the edit distance and the OCR error matrix. Longer edit distances are assessed more negatively and respective edit distances are also weighted via the OCR error score matrix. The OCR error score matrix may also be referred to as a confusion matrix based on known OCR mismatches. For instance, because 5 and S are commonly confused with each other during OCR, this mistake is penalized less than other letter mismatches such as P to 3. Common errors are acceptable while rarer ones are not. Only results with the highest format confidence score are returned. For example, values less than a predetermined limit, such as for example 0.3, may not be returned. This predetermined limit is a matter of design choice. Example I is an example of an OCR error matrix to illustrate the confusion concept, where the lower the number, the less the penalty weight applied to the error.

Example 1

|   | A | B | 8 | O |
|---|---|---|---|---|
| A | 0 | 1 | 0.9 | 1 |
| B | 1 | 0 | 0.3 | 0.7 |

In this example OCR error matrix, the characters A and B in the first column to are compared to the characters A, B 8 and O in the top row. Because an A to A comparison has no error, its value is zero. Similarly, for the B to B comparison, the error probability is 0. The comparison of A to B, or B to A, is not a common error and is heavily penalized with a value of 1, indicating complete lack of similarity. In the A to 8 comparison, this error is again not common but is more frequent than the A to B comparison and, as such, carries a penalty of 0.9. In the A to capital O comparison, this error is rare and carries a penalty value of 1. In the B to 8 comparison, this is fairly common error and garners an error value of 0.3. For the B to capital O comparison, this again is not common but does occur enough that its error penalty is 0.7. The OCR error matrix is created to compare to each character to another character within the general and specific character sets provided in the general and document type specific learn sets 132, 134, respectively.

Format scoring module 140 generates confidence scores for the information contained in all the columns processed using predetermined formats from the general and specific learn sets. For example, in FIG. 1 on document 10, the "Subj No." column 23 has a very specific format. The words consists several letters (mostly uppercase) and digits. An abstract format description would be CCCCDDDC where "C" represents alphabetic characters and "D" represents digits. All course identifications, such as "ENGL201B" or "MATH314A" are compared to this format description to determine exact matches, which are scored highest. A feature of format scoring module 140 is that it can be "trained" on new formats as it calculates the edit distance to all untrained formats it encounters. For example, one transcript may use only letter grades such as A, B, C, D and F having a format of a single character "C" while another may use A, A+, A−, B, B+, B−, C, C+, C−, etc. When encountering the string A+, extraction system 100 would recognize it as a letter grade A with an extra character and may generate a new format such as CS, where C is a single letter and S is a symbol within the character set. This learning may occur with the help of line morphology module 150.

Table header detection module 160 localizes table headers and assigns their positions irrespective of potential line breaks within the header strings. Table header detection module 160 interacts with modules 110, 130, 170 and 190.

Table header detection module 160 searches for the header words that typically appear on top of a table in the OCR document scan strings. Fuzzy string searching with regard to edit distance and N-gram approaches is used to locate header words and identify line-split headers (i.e., multi-word headers which are distributed across multiple document lines). United States Patent Publication No. 2006/0212431 A1, entitled "Associative Memory," published Sep. 21, 2006, and incorporated by reference herein, describes how one can represent textual information to search for clusters and perform comparisons.

Fuzzy string searching, which is also termed approximate string matching, is the technique of finding strings that match a pattern approximately (rather than exactly). The problem of approximate string matching is typically divided into two sub-problems: finding approximate substring matches inside a given string and finding dictionary strings that match the pattern approximately. Edit distance between two strings of characters generally refers to the Levenshtein distance. Edit distance may also refer to the whole class of string metrics that measures distance as the weighted or unweighted number of operations required to transform one string into another string. Levenshtein distance between two words is the minimum number of single-character edits (i.e., insertion, deletion, substitution) required to change one word into the other. However, there are several different ways to define an edit distance, depending on which edit operations are allowed: replace, delete, insert, transpose, substitute, and so on. The edit distance definition used is a matter of design choice. Briefly, an n-gram is a contiguous sequence of n items from a given sequence of text or speech. The items can be phonemes, syllables, letters, words or base pairs according to the application. The n-grams are typically collected from a text corpus. An n-gram of size 1 is referred to as a "unigram"; size 2, a "bigram"; and size 3, a "trigram". Larger sizes are sometimes referred to by the value of n, e.g., "four-gram", "five-gram", and so on.

In addition, table header detection module 160 is also used to filter estimated column types calculated on the basis of the string formats, i.e., to perform format filtering. When a possible header string is identified for a given column, table header detection module 160 examines the data in the column beneath the possible header to determine if the format of to the content of the cells in the content cell line would be consistent with the possible header, and the possible header string is examined to see if it is consistent with the format of the column content. For example, if the possible header string found was "GRD" and the content of the column beneath contained "A+", "B" and "F", table header detection module 160 would have high confidence that the header "GRD" was associated with GRADES in the output table and that the format of the column content was consistent with a letter grade. United State Patent Application No. 2011/0103689 A1, entitled "System and Method for Obtaining Document Information", published May 5, 2011, and incorporated by reference herein, describes a string-format based filtering engine usable in table header detection module 160.

Similar to the format scoring module 140, table header detection module 160 uses, from the learn sets 132, 134, a predefined set of header strings containing commonly found headers for localizing headers within the OCR scan document. This set of predefined headers strings is associated with a respective column identifier header used in the table of extracted data. For example, in Grade column 56 in table 50 of FIG. 2, the strings "Grade" "Grades" and "GRD." or "GRD:" would be learned and converted into an established format such as "Grade" in the output table containing the extracted data. The learned strings may be added to the predefined set of header strings found in the learn set. However, if the string "Grade Points" or "GRD PTS" were found it would not be learned and converted, as it differs from a letter grade, and a number is associated with "Grade Points". The strings would then be scored to differentiate the learned strings and substrings within that string between the column identifications or identifiers in place. This process may be described as a "contrast enhancement," based on textual information.

When the header strings are split over multiple lines, table header detection module 160 calculates the actual header position and start line. This technique is also used by line morphology module 150 for content cells having more than one line. This ensures that multi-line headers can be uniquely recognized and assigned to column identifications. Finding header strings alone or finding strings with a line would not help find a multiline header. Thus, a certain area is scanned for words that determine a certain meaning (e.g., where to put the content from a column). In the following Example 2, the line break within a table header is indicated with a forward slash symbol "/":

Example 2

"Total/Amount", "Total/Quantity", "Quantity/Ordered".

In Example 2, a correct identification of the column content is only possible if multi-line headers are recognized. Without multiline header detection, the header strings would appear to be "Total", "Total", and "Quantity" instead of the proper headers "Total amount", "Total quantity" and "Quantity ordered". By merging across lines, the correct meaning and, thus, the correct mapping into a table for extraction can be determined.

The information returned by table header detection module 160 contains a score based on (i) the reliability of the header columns, (ii) the column center positions, (iii) the potential column boundaries (based on textual structure below the header in the content cells), (iv) the amount of separators indicated by page split detector module 170 for multi-stacked tables, and (v) the amount of headers missing from a header line (including a prediction as to where the missing headers could be found as a result of the interplay with line morphology module 150 and redundancy repair module 180). A missing header is unusual and may occur because of a poor OCR scan of a document having darkened header backgrounds caused by low contrast scanning.

Line morphology module 150 locates repetitive patterns across lines to aid page split detector module 170 and decision module 190. Line morphology module 160 interacts with modules 110, 140, 180 and 190. Line morphology module 150 is a pattern clustering module that searches for similar patterns on the detected bounding boxes of the string type. Line morphology module 150 interacts with page split detector module 170 to find page split points for multi-stack tables (within the header detection) and clusters lines similar in shape to aid it in detecting how many document columns exist based on repetitive patterns. Line morphology module 150 evaluates patterns based upon the presence and absence of words on an adaptive grid within the OCR scan document page and clusters similar lines for extraction grouping.

Line morphology module 150 also accomplishes line matching in the extracted cells found in the result table, such as table 50. The line pattern is reduced to a quantified representation of the string type, and the "all-to-all" morphology correlation between all lines considered to be candidates for table lines is calculated for a clustering. A matrix of all lines is compared to one another (similar to the OCR error matrix character matching), and a comparison percent between each line to the other is filled in the matrix. For example, assume there are three lines: Line 1 contains strings S1 having a format of CCCCCC, S2 with format CCCCCC, and S3 with format CCCCCC; Line 2 contains strings S4 with format CCCDDD, S5 with format C and S6 with format D; and Line 3 contains strings S4, S5, and S6' with format DD where string S6' pattern is similar to but not the same as string S6. "C" indicates a character while "D" indicates a number. The result matrix for the comparison of Lines 1-3 is shown in Example 3 below.

Example 3

|        | Line 1 | Line 2 | Line 3 |
|--------|--------|--------|--------|
| Line 1 | 1.0    | 0.22   | 0.22   |
| Line 2 | .22    | 1.0    | .88    |
| Line 3 | .22    | .99    | 1.0    |

Lines 2 and 3 differ only from one another by one character while line 1 differs from lines 2 and 3 by 14 characters and has a different format pattern, leading to a low similarity percentage. Lines 2 and 3 would be matched. Using a predetermined similarity threshold value, for example, everything above 75 percent is consider to be same, line similarity exceeding this threshold would be clustered. One algorithm to accomplish this is simple: calculate the similarity between all possible line pairs and determine what similarity levels shall be grouped together to create line cluster groups.

This calculation may also be performed for the page split points defined by the page split detector module 170 with multi-stacked tables. For a multi-stack table where two header lines are clustered, one header line may be eliminated.

Furthermore, former observed line and label patterns stored in statistics module 130 may be taken into account for the clustering. For example, extractor system 100 recognizes it has seen this line pattern before (word pattern and space patterns). These can serve as seeds to aggregate similar line patterns from the actual OCR scan document, and, thus aid the clustering and the subsequent labeling of the clusters.

Page split detector module 170 considers information received from line to morphology module 150 and table header detection module 160 in order localize the document columns Page split detector module 170 determines the presence and position of separators between multi-stacked tables on a document page. Page split detector module 170 interacts with modules 150, 160, and 180.

Figure 6:
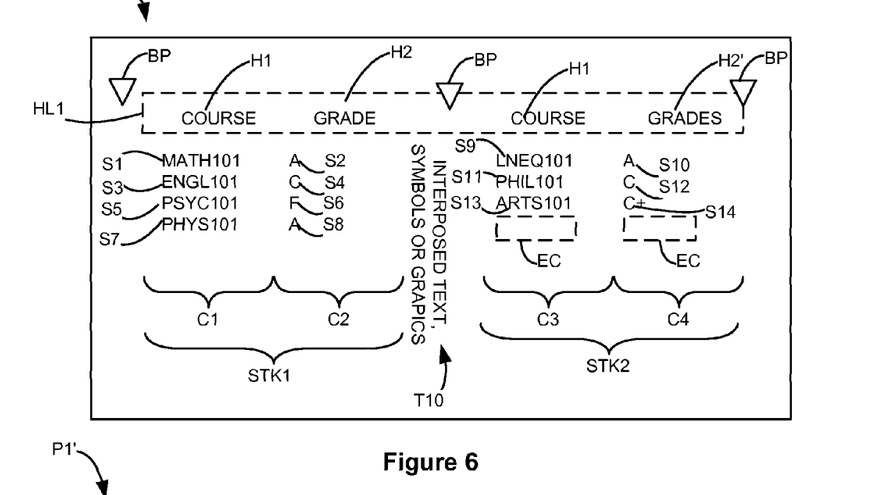
FIGS. 6-7 are examples of a horizontal multi-stack table and a vertical multi-stack table, respectively.

An example of a multi-stack table is shown in FIG. 6. To be a multiple stack or multi-stack table, each stack in the table must have the same or substantially similar headers, as determined by the interplay of table header detection module 160 and line morphology module 150. Page P1 of an OCR document file contains two horizontally spaced table stacks STK1, STK2. Stack STK1 comprises headers H1, H2 containing header strings COURSE and GRADE, respectively, while stack STK2 comprises headers H1, H2' containing header strings COURSE and GRADES. Note that header string of header H2' is similar to but varies from header string of header H2. Beneath header H1 of stack STK1 are tabular data in the forms of strings S1, S3, S5, S7 containing strings MATH101, ENGL101 PSYC101 and PHYS101, respectively. Header H1 of stack STK1 and the four strings S1, S3, S5, S7 form column C1. Beneath header H2 of stack STK1 are tabular data in the forms of strings S2, S4, S6, S8 containing strings A, C, F, and A, respectively. Header H2 of stack STK1 and these four strings S2, S4, S6, S8 form column C2.

Beneath header H1 of stack STK2 are tabular data in the form of strings S9, S11, S13 containing strings LNEQ101, PHIL101 and ARTS101, respectively. Header H2' of stack STK2 and these three strings S9, S11, S13 form column C3. Beneath header H2' of stack STK2 are tabular data in the forms of strings S10, S12, S14 containing A, C, and C+, respectively. Header H2' of stack STK2 and these four strings S10, S12, S14 form column C4. Columns C1 and C2 may also be viewed as being comprised of five cells, and columns C3 and C4 as having five cells, with the bottom cell in each of columns C3 and C4 empty. These empty cells are indicated by the dashed line rectangles EC.

A header line HL1, having the strings COURSE, GRADE, COURSE GRADES spaced across the line, is present. Table header detection module 160 has detected three break points BP, indicated by the triangles, in header line HL1 and has identified the headers. Table header detection module 160 can also detect if repetitive header word structures exist in a header line. Thus, if a header line analysis reveals a column order, such as "course, grade" followed by "course, grade", header detection module 160 can easily predict the raw localization of the corresponding content cells based on the header.

Figure 8:
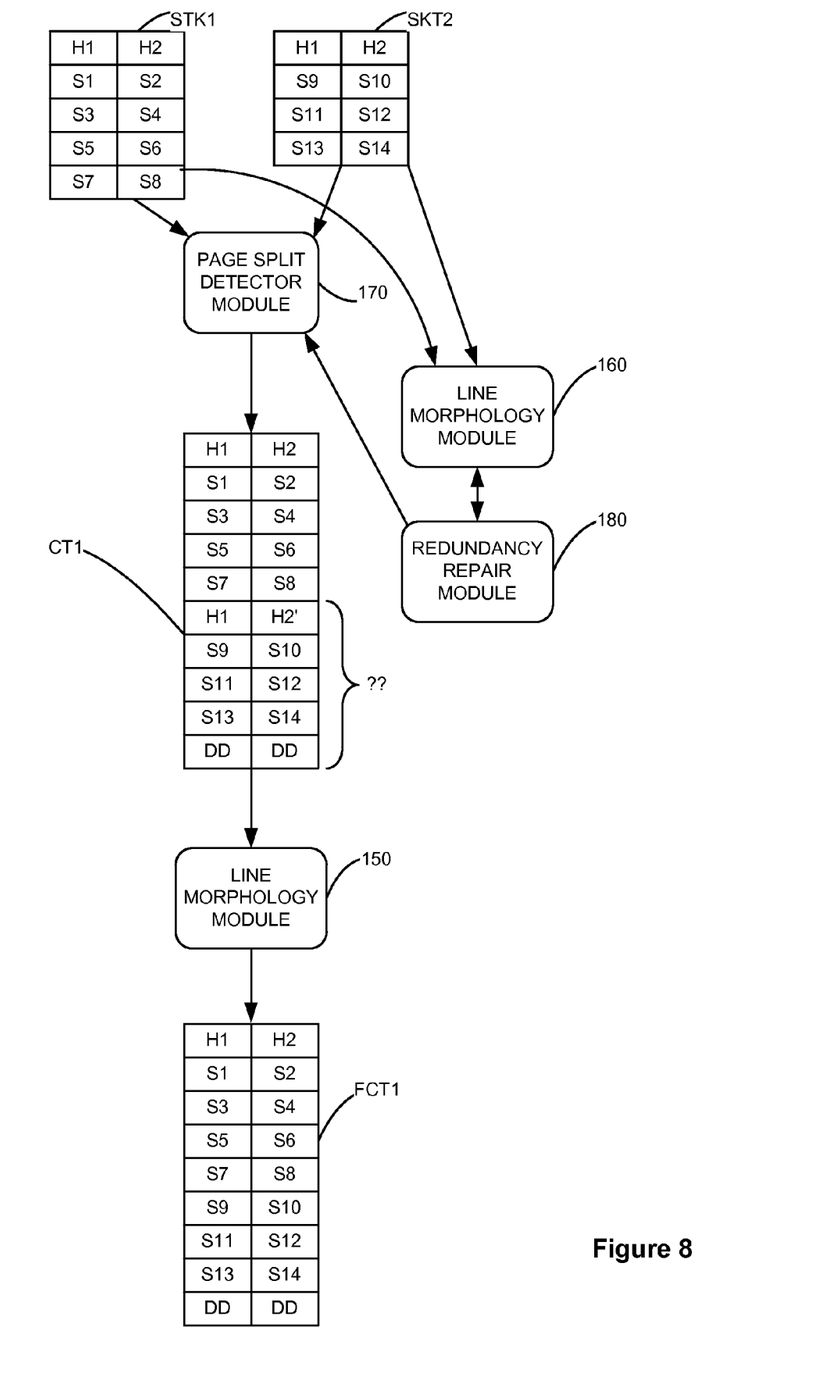
FIG. 8 is a schematic depiction of the operation of the page split detector module and line morphology module on a horizontal multi-stack table.

FIG. 8 schematically illustrates how the multi-stack table is processed. Stacks STK1 and STK2 are processed by page split detector module 170 and are recognized as being a multi-stack table. After application of page split detector module 170, the multi-stack table is treated as a single-column CT1. Concurrently with this, stacks STK1 and STK2 are processed by line morphology module 150, as it has been determined that stack STK2 contains empty cells in the last line of content cells when doing line clustering. The line pattern exhibited in FIG. 6 for the content cells is "CCCCDDD" "C" "CCCCDDD" "C", indicating 4 cells. However, for the line having strings S7 and S8, there are no corresponding strings found in the location of the two empty cells EC. In addition, line morphology module 150 has also remove interposed text T10 as the format of this string does not match with the other formats in the line. A similar process is used to remove the text TX1 composed of the strings "INSTITUTION" and "CRED" that appears to be content in the column SUBJ NO. of document 10 shown in FIG. 1 from the column DESCRIPTION in output table 50 shown in FIG. 3.

Stacks STK1 and STK2 are sent to the redundancy repair module 180 to have dummy data DD inserted into each of the empty cells lines. Stacks STK1 and STK2 are reviewed by line morphology module 160 to see if any changes have occurred as a result of the repair. Upon finding changes, stacks STK1 and STK2 are processed at page split detector module 170 to form a virtual combined table CT1 having two columns and containing all the strings S1-S14, two dummy data cells DD, and two header rows H1, H2 and H1, H2'. Combined table CT1 may be further analyzed by line morphology module 150 to remove the second header line H1, H2' as headers H2 and H2' were considered to be similar enough. This process results in the final combined table FCT1 having two columns one with header H1 associated with strings S1, S3, S5, S7, S9, S11, S13 and a dummy data cell and another column with header H2 associated with strings S2, S4, S6, S8, S10, S12, S14 and the other dummy data cell. The columns may then be mapped by decision module 190 to corresponding columns within the output table FCT1.

Figure 7:
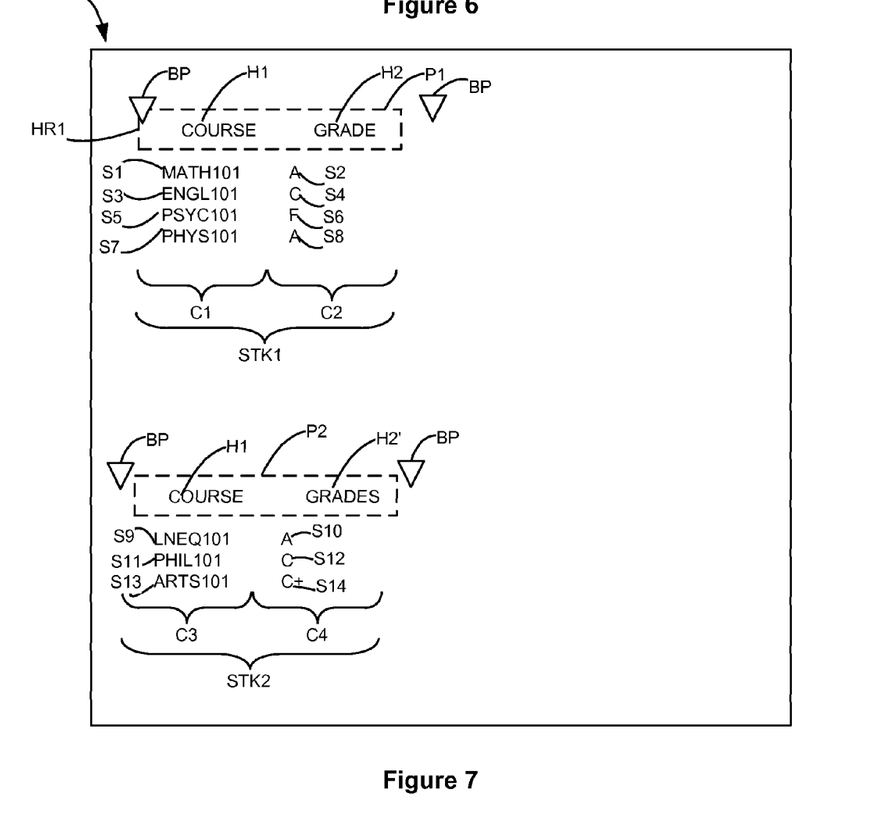

Appending of the portions of a multi-stack table depends upon the reading orientation of the language. Where reading in a given language is left to right in a horizontal manner, the appended stack is appended to the end of the OCR scan page where the first multi-stack appears. If reading is done from bottom to top in a vertical fashion, the stack is appended to the top of the OCR scan page.

Where multiple tables exist on the document page, such as two tables each having one or more columns and having the same or substantially the same header line are vertically separated on the document page, as illustrated in FIG. 7, the localization of the two tables is performed using the modules 150, 160, 170 and 180 as previously described. In an example embodiment where the original document is in portrait orientation and contains stacks STK1 and STK2 vertically spaced apart on the OCR scan page as shown in FIG. 7, the OCR scan page orientation is rotated 90 degrees to detect this form of a multi-stack table. On the physical page, the tables would be horizontally separated but the orientation of the character data would also be vertical. However, in the OCR document file, each character is self leveling and is able to rotate about its center so that they remain in a horizontal position. After OCR scan rotation has occurred, processing is substantially the same as that described with respect to FIGS. 6 and 8. Stacks STK1 and STK2 in FIG. 7 are identical to those discussed in FIG. 6.

Table header detection module 160 delivers information about repetitive header word structures. Although similar to a line of content cells having a repetitive pattern, a header line would not be grouped with such lines because the patterns of its strings would not match the patterns of the strings in the line of content cells and, thus, would be an ungrouped line along with other lines that may be in the OCR document scan file. If a header analysis reveals a column order, such as "grade, description, points, grade, description, points," table header detection module 160 can easily predict the raw localization based on the header. A refinement is performed using line morphology module 150 that will reveal any potential mismatches of the words within the table and the localization of the header with respect to the table content. This is especially relevant if the document layout of the document in the OCR document file follows centered headers while the table content is left aligned.

As indicated, format scoring module 140 interplays with line morphology module 150 and with the table header analysis performed by the respective modules 150, 160 and thus also influences page split detector module 170. Page split detector module 170 determines the number of columns in the table (e.g., multi-stacked tables that are printed side-by-side on a document). The numerical determination is based upon header detection and line morphology, and manual intervention by a user is possible if a correction is needed. Compared to manual data entry, table header detection module 160 significantly reduces the to amount of changes required to correct the extracted data following unrecognized results.

Redundancy repair module 180 activates if a document line does not follow the general table-specific rules and interacts with modules 110,160 and 190. Redundancy repair module will insert "dummy words" or "guessed content" into the document as a way to aid line morphology module 150 (and thus also page split detector module 170). Redundancy repair module 180 adds dummy strings or strings with little or low confidence to content to aid line morphology module 160 in pattern clustering. The inserted dummy strings are later filtered out in the decision module 190.

Although specific rules or assumption are found in each table, occasionally people, content, or the results of OCR fail to comply with such rules. For example, one would expect a table to contain an entry for each column, especially if all columns are needed to completely specify the line item. However, this is not always the case, as errors in data entry, misaligned printing, or OCR errors that ignore or incorrectly recognize characters may also be present during the process. The human mind may overlook such errors or hardly recall seeing them, but for algorithms, especially ones like line morphology module 150, skipped words or columns are quite noticeable. Such errors often result in poor clustering and, subsequently, poor extraction performance. Redundancy repair module 180 is trained with such rules and assumptions and, if there is no expected content within a line, it will attempt to fill this gap with dummy words or the best possible content it can reassign to that position. Line morphology module 150 will cluster the repaired patterns to fill existing gaps in line items. Missing data can be inferred through the use of white space analysis within a line. When a line has been determined to be a header line of a determined pattern or a content line of a determined pattern, and a given line has an extended white space at a location in the line where content is expected, it is assumed that content is missing. Location information provided with the string data may be used to help determine the amount of white space between two strings in a given line.

Decision module 190 integrates the information generated by the interplay of other modules and maps the found headers and corresponding content cells to fill a two-dimensional grid having column identifiers arranged as provided by user input or uses columns identifiers arranged based on a predetermined default grid. Decision module 190 integrates and weighs all information from the aforementioned modules and decides which string words are selected and how to order the cells of the defined table for extraction. The to final result is then provided via I/O module 120 to the user or other modules 240 for further processing. A user may provide feedback regarding the result, which may then be fed back to extraction system 100, thereby allowing extraction system 100 to reprocess the OCR scan document using the newly provided information.

Lastly, decision module 190 may store previous decision patterns within statistics module 130 and refer to them when needed. This is called "historical extraction", where previously determined patterns are reused to actually shape extraction data.

Figure 9A:
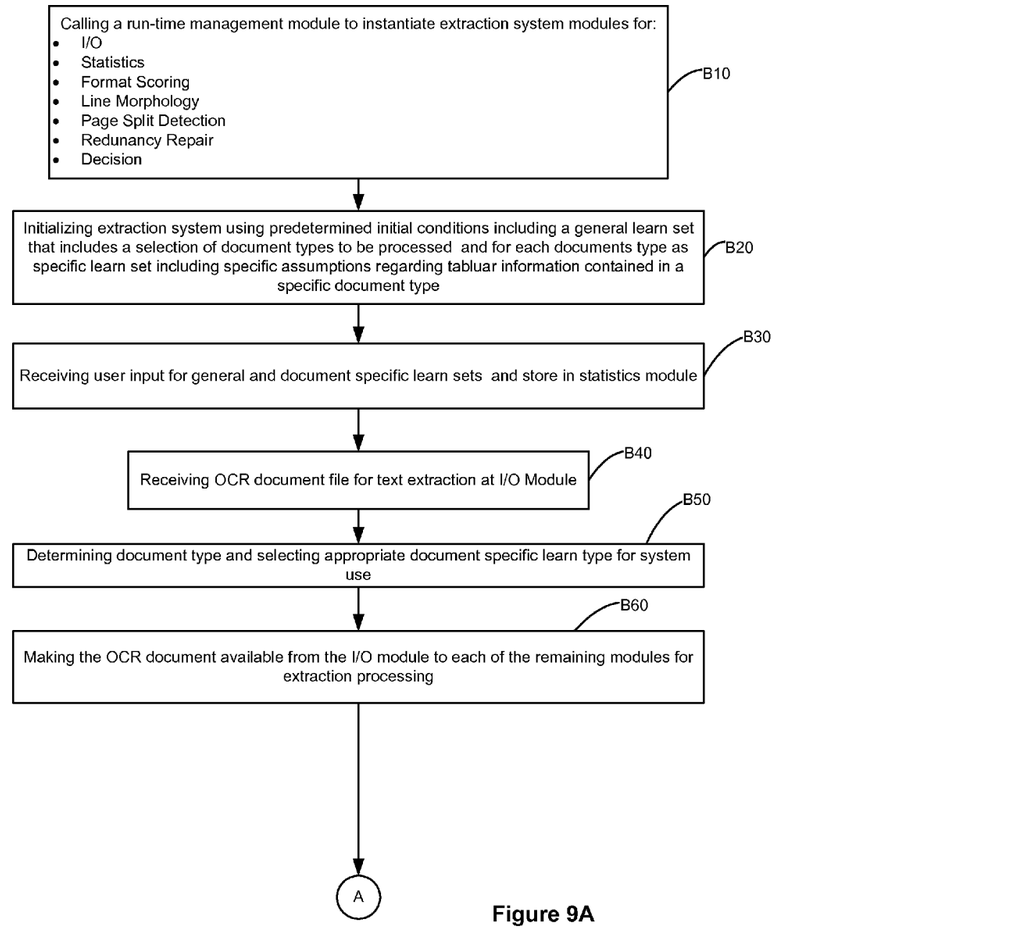
FIGS. 9A-9B illustrate a high level operational flow diagram of the extraction system of FIG. 5.
Figure 9B:
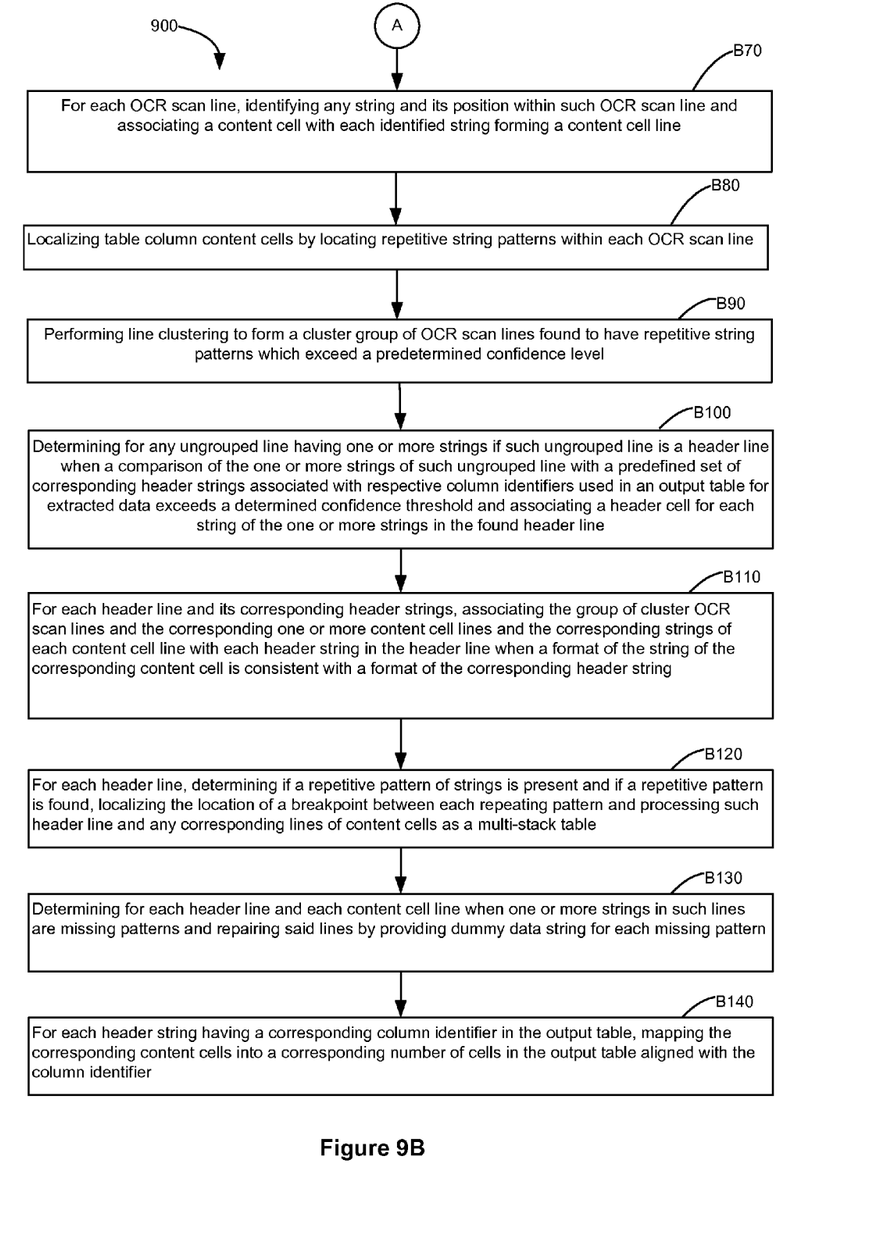

FIGS. 9A-9B provide a high level overview of the operation of system 100. At block B10, runtime management module 110 instantiates each of modules 120, 130, 140, 150, 160, 170, 180, and 190. At block B20, system 100 is then initialized using predetermined conditions including a general learn set including a selection of document types to be processed and for each document type to be processed a document specific learn set, including specific assumptions regarding tabular information contained in a specific document type.

At block B30, user input for the general learn set, specific learn set, and output table arrangement and mapping of OCR scan document table columns to the output table of extracted data may be received. User input may include, but is not limited to, a stack border, stack bound boxes, column bounding boxes, line bounding boxes, or a column label. At block B40, an OCR scan document file for processing may be received at the I/O module. At block B50, determining a document type contained in the OCR scan document file is performed, and the appropriate document type specific learn set is selected for use by extraction system 100. In some example embodiments, a user may provide this determination to extraction system 100.

At block B60, the OCR scan document is made available to each of modules 130-190 for extraction processing.

One example extraction process 900 is shown in FIG. 9B. Concurrently using at least the I/O, Statistics, Format Scoring, Line Morphology, Page Split Detector, Redundancy Repair and Decision modules, extraction system 100 performs the following operations on the OCR scan file having tabular information having a plurality of content cells:

for each OCR scan line, identifying any string and its position within such OCR scan line and associating a content cell with each identified string forming a content cell line (block B70);

localizing table column content cells by locating repetitive string patterns within each OCR scan line (block B80);

performing line clustering to form a cluster group of OCR scan lines found to have repetitive string patterns which exceed a predetermined confidence level when the repetitive string patterns are compared to one another (block B90);

finding, for any ungrouped line having one or more strings, if such ungrouped line is a header line when a comparison of the one or more strings of such ungrouped line with a predefined set of corresponding header strings associated with respective column identifiers used in an output table for extracted data exceeds a determined confidence threshold and associating a header cell for each string of the one or more strings in the found header line (block B100);

for each found header line and its corresponding header strings, associating the group of cluster OCR scan lines and the corresponding one or more content cell lines and the corresponding strings of each content cell line with a corresponding header string in the header line when a format of the string of the corresponding content cell line is consistent with the associated format of the corresponding header string-(block B110);

for each header line determining if a repetitive pattern of strings is present and if a repetitive pattern is found, localizing the location of a breakpoint between each repeating pattern and processing such header line and any correspond lines of content cells as a multi-stack table (block B120);

determining for each header line and each content line when one or more strings in such lines are missing patterns, and repairing said line by providing dummy data string for each missing pattern (block B130); and for each header string having a corresponding column identifier in the output table mapping the corresponding content cells into a corresponding number of cells in the output table that are aligned with the column identifier in an output table (block B140).

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

What is claimed is:

1. A method for automatically extracting tabular data from an OCR scan document, comprising:

receiving the OCR scan document for processing;

identifying, for each OCR scan line, any string and its position within the OCR scan line and forming a content cell line by associating a content cell with each identified string;

localizing table column content cells by locating repetitive string patterns within each OCR scan line;

forming a cluster group of OCR scan lines when the repetitive string patterns exceed a predetermined confidence level;

determining for any ungrouped line that such ungrouped line is a header line when a comparison of one or more strings of such ungrouped line with a predefined set of corresponding header strings associated with respective column identifiers used in an output table for extracted data exceeds a predetermined confidence threshold;

associating a header cell for each of the one or more strings in each determined header line;

for each header line and its associated header cell, associating the group of cluster OCR scan lines and the corresponding content cell line and the corresponding strings of each content cell line with a corresponding header string in the header line when a format of the string of the corresponding content cell line is consistent with a format of the corresponding header string;

for each header line, determining if a repetitive pattern of strings is present and if a repetitive pattern is determined, localizing the location of a breakpoint between each repetitive pattern and processing the header line and the corresponding content cell line as a multi-stack table;

determining, for each header line, whether one or more header strings are missing patterns and repairing the header line missing patterns by providing a dummy data string for each missing pattern in the header strings;

determining, for each content cell line, whether one or more content cell line strings are missing patterns and repairing the content cell line missing patterns by providing a dummy data string for each missing pattern in the content cell line strings; and for each header string having a corresponding column identifier in the output table, mapping the corresponding content cells into a corresponding number of cells in the output table aligned with the column identifier.

2. The method of claim 1, wherein the identifying, the localizing, the forming, the determining the header line, the associating the header cell, the associating the group of the cluster OCR scan lines, the determining the repetitive pattern, the determining the missing patterns in the header strings, the determining the missing patterns in the content cell line strings, and the mapping are performed concurrently.

3. The method of claim 1, further comprising receiving user input for at least one of a general learn set, a specific learn set, an arrangement of the output table, and a mapping of table columns of the OCR scan document to the output table.

4. The method of claim 1, further comprising determining a document type contained in the OCR scan document and selecting an appropriate document specific learn set.

5. The method of claim 4, wherein the determining the document type is determined based on a general learn set having a plurality of document types and on a document specific learn set for the document type.

6. A method for automatically extracting tabular data from an OCR scan file, comprising:
receiving the OCR scan file having a plurality of content cells containing the tabular data to be extracted;
determining, based on a general learn set having a plurality of documents types and a document specific learn set for each document type having information describing a tabular data expected to be contained therein, a document type contained in the received OCR scan file and selecting, based on the determined document type, the corresponding document specific learn set;
extracting the tabular data from the plurality of content cells by:
identifying, for each OCR scan line in the OCR scan file, one or more strings and the position thereof in the OCR scan line and associating the one or more identified strings with a corresponding content cell, said one or more content cells forming a content cell line;
determining a string pattern for each of the identified one or more strings;
localizing one or more table column content cells within the content cell line by locating a repetitive string pattern within the determined one or more string patterns in one or more content cells of the content cell line;
forming one or more cluster groups of content cell lines found to have repetitive string patterns which exceed a predetermined confidence level when said repetitive string patterns are compared to one another;
comparing, for each ungrouped content cell line, the one or more strings of such ungrouped content cell line with a predefined set of corresponding header strings associated with respective column identifiers used in an output table for extracted data;
identifying such ungrouped content cell line as a header line and associating a header cell for each string of the one or more strings in the header line to form one or more header strings when the comparison exceeds a predetermined confidence threshold;
associating each found header line and its corresponding one or more header strings with a cluster group in the one or more cluster groups of content cell lines and the corresponding strings of each corresponding content cell therein when a format of the corresponding string of the corresponding content cell is substantially the same as a format of corresponding header string;
determining, for each found header line, whether or not a repetitive pattern in the header strings is present, and, when a repetitive pattern is determined, localizing a location of a breakpoint between each repeating pattern and identifying such determined header line and any corresponding cluster group of content cell lines as a multi-stack table;
repairing each header line and each content cell line in the corresponding cluster group of content cell lines that is missing a pattern by providing a dummy data string corresponding to each missing pattern; and
mapping, for each header string in each found header line having a corresponding column identifier in the output table, the content cells of the corresponding group of content cell lines into a corresponding number of cells in the output table aligned with the column identifier.

7. The method of claim 6, wherein, for each document type specific learn set, the information describing the tabular data includes a user provided mapping of input column identifiers to the output table and a lexicon of header strings and respective column identifiers.

8. The method of claim 6, wherein, for each document type specific learn set, the information describing the tabular data includes a user provided mapping of input column identifiers to the output table and a user provided format description of the tabular data to be extracted.

9. The method of claim 6, wherein, for each document type specific learn set, the information describing the tabular data includes a user provided mapping of input column identifiers to the output table and a pre-defined set of words and strings.

10. The method of claim 6, wherein, for each document type specific learn set, the information describing the tabular data includes a user provided mapping of input column identifiers to the output table and at least one page split line.

11. The method of claim 6, wherein, for each document type specific learn set, the information describing the tabular data includes a lexicon of specific strings, the lexicon of specific strings including a specific header string associated with the corresponding document type, a plurality of specific format descriptions, a character set, a plurality of specific table column identifications for use in the output table, and a user provided mapping of headers found in the OCR scan file to be used in the output table.

12. The method of claim 6, wherein upon determining that at least one of the header cells in a header line is empty, inserting a predetermined string having dummy data in a format corresponding to a string expected to be found in such empty header cell.

13. The method of claim 6, further comprising determining whether multiple tables of tabular data are present in the OCR scan file and, if it is determined that multiple tables are present, determining a breakpoint therebetween.

14. The method of claim 6, further comprising determining whether multiple tables of tabular data are present in the OCR scan file and, if it is determined that multiple tables are present, determining whether the multiple tables are vertically separated and rotating the OCR scan file so that the multiple tables are horizontal if it is determined that the multiple tables are vertically separated.

15. A method for automatically extracting tabular data from an OCR document, the method comprising:

creating an output table for receiving the tabular data to be extracted from the OCR document, and a mapping between the tabular data to be extracted and the output table;

receiving the OCR document having a plurality of content cells containing the tabular data to be extracted;

determining, based on a general learn set, a document type contained in the received OCR document and selecting, based on the determined document type, a corresponding document specific learn set;

extracting the tabular data from the plurality of content cells by:

for each OCR scan line in the OCR document, identifying one or more strings and the position thereof and associating a content cell with each of the one or more identified strings, said one or more content cells forming a content cell line;

determining a string pattern for the identified one or more strings;

localizing one or more table column content cells by locating one or more repetitive string patterns within the one or more content cells of the content cell line;

performing line clustering to form one or more cluster groups of content cell lines found to have repetitive string patterns which exceed a predetermined confidence level when said repetitive string patterns are compared to one another;

comparing, for each ungrouped content cell line, the one or more strings of such ungrouped content cell line with a predefined set of corresponding header strings associated with respective column identifiers used in the output table and when the comparison exceeds a predetermined confidence threshold, setting such upgrouped content cell line as a header line and associating a header cell for each string of the one or more strings in the header line to form one or more header strings;

associating each header line and its corresponding header strings with a cluster group in the one or more cluster groups of content cell lines and the corresponding content cells therein and the corresponding strings of each content cell therein when a format of the corresponding string of the corresponding content cell is substantially the same as a format of corresponding header string;

determining, for each header line, whether or not a repetitive pattern in the header strings is present and, when a repetitive pattern is identified, localizing a location of a breakpoint to be between each repetitive pattern and identifying such header line and any corresponding cluster group of content cell lines as a multi-stack table;

determining for each header line and each content cell line in the corresponding cluster group of content cell lines whether one or more strings in each of such lines are missing patterns and repairing each said content cell line by providing a dummy data string corresponding to each missing pattern;

mapping, for each header string in each header line having a corresponding column identifier in the output table, the content cells of the corresponding group of content cell lines into a corresponding number of cells in the output table that are aligned with the column identifier.

16. The method of claim 15 wherein, for each document type learn set, the information describing the tabular data includes a user provided mapping input column identifiers to the output table and at least one page split line.

17. The method of claim 15 wherein, for each document type learn set, the information describing the tabular data includes a lexicon of specific strings having a specific header string associated with the corresponding document type, a plurality of specific format descriptions, a character set, a plurality of specific table column identifications for use in the output table, and a user-provided mapping of headers found in the OCR document to be used in the output table containing the extracted data.

18. The method of claim 15 wherein upon determining that at least one of the header cells in a head line is empty, inserting a predetermined string having dummy data in format corresponding to a string expected to be found in such empty header cell.

19. The method of claim 12 further comprising determining whether at least two tables of tabular data are present in the OCR scan file and, when it is determined that the at least two tables are present, determining breakpoints therebetween.

20. The method of claim 12 further comprising determining whether at least two tables of tabular data are present in the OCR scan file and, when it is determined that the at least two tables are present, determining whether the at least two tables are vertically separated and, on determining that the at least two tables are vertically separated, rotating the OCR document so that the two tables are horizontal.

* * * * *